(12) United States Patent
Yamaura

(10) Patent No.: US 6,656,638 B1
(45) Date of Patent: Dec. 2, 2003

(54) NON-AQUEOUS ELECTROLYTE BATTERY HAVING A LITHIUM MANGANESE OXIDE ELECTRODE

(75) Inventor: Kiyoshi Yamaura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/505,186

(22) Filed: Feb. 16, 2000

(30) Foreign Application Priority Data

Feb. 24, 1999 (JP) .......................... P11-046947

(51) Int. Cl.$^7$ .............................. H01M 4/58; H01M 4/50
(52) U.S. Cl. ............... 429/231.95; 429/224; 429/231.1; 429/231.8; 429/188; 429/322
(58) Field of Search .................... 429/231.95, 224, 429/231.1, 231.8, 188, 322

(56) References Cited

U.S. PATENT DOCUMENTS 5,556,721 A * 9/1996 Sasaki et al. ............... 429/218
5,578,395 A * 11/1996 Yoshimura et al. ......... 429/197
5,686,138 A * 11/1997 Fujimoto et al. ........... 429/197
6,413,678 B1 * 7/2002 Hamamoto et al. ......... 429/332

FOREIGN PATENT DOCUMENTS

| DE | 19615800 A1 | 12/1996 |
| EP | 0630064 A1 | 12/1994 |
| JP | 08227709 | 9/1996 |
| JP | 09129228 | 5/1997 |
| WO | 98/38648 | 9/1998 |

* cited by examiner

Primary Examiner—Patrick Ryan
Assistant Examiner—Angela J Martin
(74) Attorney, Agent, or Firm—Sonnenschein, Nath & Rosenthal LLP

(57) ABSTRACT

A non-aqueous electrolyte battery including a positive electrode containing a complex oxide of a transition metal, a negative electrode arranged facing the positive electrode and containing metal lithium, lithium alloy, or a carbon material capable of doping and undoping lithium, and a non-aqueous electrolyte interposed between the positive electrode and the negative electrode. The complex oxide of a transition metal is a complex oxide of lithium and manganese represented by the general formula $LiMn_{1-y}B_yO_2$, with $0<y<1$.

8 Claims, 2 Drawing Sheets

NON-AQUEOUS ELECTROLYTE BATTERY HAVING A LITHIUM MANGANESE OXIDE ELECTRODE

RELATED APPLICATION DATA

The present application claims priority to Japanese Application No. P11-046947 filed Feb. 24, 1999 which application is incorporated herein by reference to the extent permitted by law.

BACKGROUND OF THE INVENTION

1. Field of the Invention

This invention relates to a non-aqueous electrolyte battery having a positive electrode, a negative electrode and a non-aqueous electrolyte interposed between the positive and negative electrodes.

2. Description of the Prior Art

Recently, in keeping pace with rapid progress in a variety of electronic equipments, investigations are going on in the field of a re-chargeable secondary battery as a battery that can be used conveniently for long and economically. Typical of the secondary batteries are lead storage batteries, alkali storage batteries and lithium secondary batteries. Of these, lithium secondary batteries are superior secondary batteries having such advantages as high output or high energy density.

These lithium secondary batteries are made up of reversibly introducing and desorbing lithium ions, a separator arranged between the positive and negative electrodes and a non-aqueous electrolyte. In general, lainar electrically conductive high molecular materials, carbon materials or metal oxides, doped with metal lithium, lithium alloys or lithium, are used as negative electrode active materials.

On the other hand, metal oxides, metal sulfides or polymers are used as the positive electrode active material. For example, non-lithium compounds, such as $TiS_2$, $MoS_2$, $NbSe_2$ or $V_2O_5$, or lithium-containing complex materials, such as $LiMO_2$, where M=Co, Ni, Mn or Fe, have been proposed. These compounds may also be used in combination.

As the non-aqueous electrolytes, a solution obtained on dissolving lithium salts in non-protonic organic solvents, such as propylene carbonate, is used.

As a separator, a high-molecular film, such as a polypropylene film, is used. The separator needs to be as thin as possible in view of lithium ion conductivity and energy density. The separator thickness is usually not larger than approximately 50 µm in view of practical utility.

Although the tendency is towards a higher capacity of the lithium secondary battery, the battery material selection in search for the best material is underway for cost reduction. Although a spinel structure manganese oxide is well-known as a manganese oxide used for the positive electrode, the theoretical capacity of the spinel manganese oxide is of the order of 150 mAh/g which is below 274 mAh/g as the theoretical capacity of $LiCoO_2$. For this reason, researches for a complex oxides represented by $LiMnO_2$, having the theoretical capacity of the same order of magnitude as $LiCoO_2$, are going on briskly.

Depending on the temperature at the the of synthesis, high temperature type $LiMnO_2$ is reported (R. Hoppe, G. Brachtel and M. Jansen in Z. Anorg. Allg. Chemie, 417, 1 (1975)), and low temperature type $LiMnO_2$ is also reported (T. Ohzuku, A. Ueda and T. Hirai (Chem. Express. 7,193 (1992), as the complex oxides represented by $LiMnO_2$.

Whilst the theoretical capacity is of the order of 300 mAh/g for both high temperature type $LiMnO_2$ and low temperature type $LiMnO_2$, if these $LiMnO_2$ compounds are used in an actual non-aqueous electrolyte battery, the actual capacity is smaller than the theoretical capacity, because of limitations as to the potential region in which the electrolyte may remain in stability.

For example, the charging capacity in an actual non-aqueous electrolyte battery is said to be of the order of 150 mAh/g and 200 mAh/g for the high temperature type $LiMnO_2$ and for the low temperature type $LiMnO_2$, respectively. As for the discharging capacity, it is as low as 50 mAh/g or less, for the potential area not lower than 1.5 V, because the $LiMnO_2$ compound is unavoidably modified in structure during the charging/discharging process.

Although the high temperature type $LiMnO_2$ and the low temperature type $LiMnO_2$ differ in the charging capacity, if the compounds are oxidized to a potential in the vicinity of 4.5 V, the discharging capacity becomes extremely small. Under these circumstances, it is desired to increase the discharging capacity of the $LiMnO_2$ compound.

SUMMARY OF THE INVENTION

It is therefore an object of the present invention to provide a non-aqueous electrolyte battery having an improved capacity of the lithium manganese oxide used for the positive electrode.

The present invention provides a non-aqueous electrolyte battery including a positive electrode containing a complex oxide of a transition metal, a negative electrode arranged facing the positive electrode and containing metal lithium, lithium alloy, or a carbon material capable of doping and undoping lithium, and a non-aqueous electrolyte interposed between the positive electrode and the negative electrode. The complex oxide of a transition metal is a complex oxide of lithium and manganese represented by the general formula $LiMn_{1-y}B_yO_2$, with $0<y<1$.

In the present non-aqueous electrolyte battery, according to the present invention, in which $LiMn_{1-y}B_yO_2$ obtained on adding B to $LiMnO_2$ is used as a positive electrode, $LiMnO_2$ is stabilized to realize a large capacity.

That is, according to the present invention, in which a lithium manganese oxide, part of Mn of which is replaced by B ($LiMn_{1-y}B_yO_2$), is used as an active material for the positive electrode, it is possible to realize a non-aqueous electrolyte battery having a large capacity.

DESCRIPTION OF THE PREFERRED EMBODIMENTS

Figure 1:
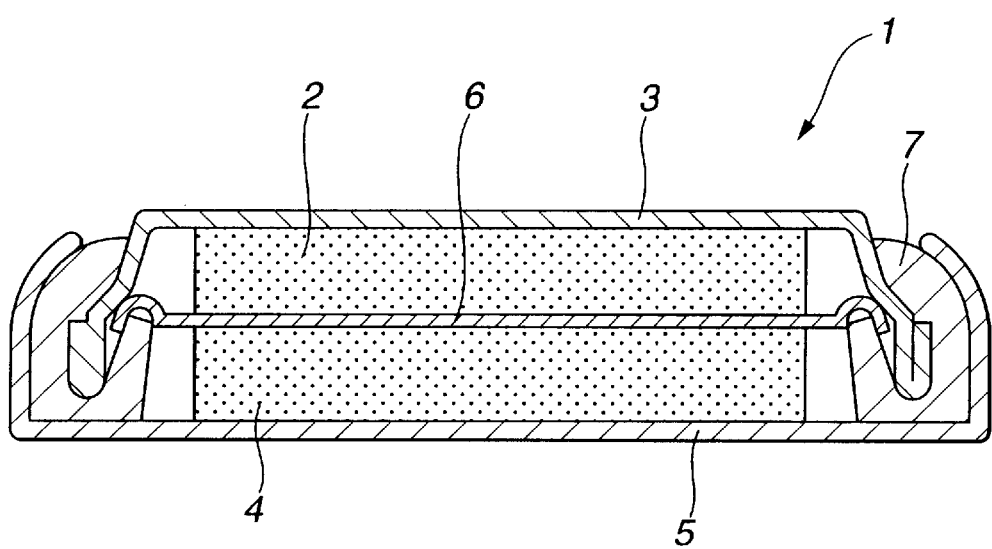
FIG. 1 is a cross-sectional view showing an illustrative structure of a non-aqueous electrolyte battery according to the present invention.

Referring to the drawings, preferred embodiments of according to the present invention will be explained in detail.

FIG. 1 shows an illustrative structure of a non-aqueous electrolyte battery according to the present invention. This non-aqueous electrolyte battery 1 includes a negative electrode 2, a negative electrode can 3, for accommodating the negative electrode 2 therein, a positive electrode 4, a positive electrode can 5, accommodating the positive electrode 4 therein, a separator 6 arranged between the positive electrode 4 and the negative electrode 2, and an insulating gasket 7. A non-aqueous electrolyte solution is charged into the negative electrode can 3 and the positive electrode can 5.

The negative electrode 2 is made up of, for example, a metal lithium foil, operating as the active material for the negative electrode. If a carbon material, capable of doping and undoping lithium, is used as the active material for the negative electrode, the negative electrode is comprised of a current collector of the negative electrode, made up for example of a copper foil, and a layer of an active material for the negative electrode, formed thereon. This layer contains the active material for the negative electrode.

The material capable of doping and undoping lithium may be enumerated by pyrocarbon, carbon blacks, such as cokes or acetylene black, carbon materials, such as graphite, carbon difficult to graphize, vitreous carbon, activated charcoal, carbon fibers, sintered organic high molecular materials, sintered coffee beans, sintered cellulose or sintered bamboo, and electrically conductive polymers, such as metal lithium, lithium alloys or polyacetylene. In particular, graphite or non-graphitizable carbon, among the above-mentioned carbon materials, exhibits extremely effective characteristics as the negative electrode materials and hence gives a high-capacity battery.

The negative electrode can 3 accommodates the negative electrode 2 and also operates as an outer negative electrode of the non-aqueous electrolyte battery 1.

The positive electrode 4 is comprised of a positive electrode current collector on which is formed a layer of an active material for the positive. This layer contains an active material for the positive electrode. In this non-aqueous electrolyte battery 1, a lithium manganese oxide of the general formula of $LiMn_{1-y}B_yO_2$, comprised of the above-mentioned high temperature $LiMnO_2$ added to with boron B, is used as an active material for the positive electrode.

Since the low temperature $LiMnO_2$ is synthesized in a temperature area with an extremely small atomic diffusion speed, it is difficult to replace a portion of the elements of the low temperature $LiMnO_2$ with other different elements, such that it is extremely difficult to improve the material.

On the other hand, since the high temperature $LiMnO_2$ is synthesized at an elevated temperature not lower than 800° C., it may be inferred that the atomic diffusion speed is high, such that part of the elements constituting $LiMnO_2$ may be replaced relatively easily with other different elements.

The present inventors have conducted perseverant researches into hetero elements capable of improving the capacity of $LiMnO_2$, and arrived at the concept of replace part of Mn of $LiMnO_2$ with B to give $LiMn_{1-y}B_yO_2$.

The high temperature $LiMnO_2$, synthesized by heating followed by slow cooling, is a high crystalline compound having an orthorhombic structure and a spatial group Pmnm. On the other hand, the high temperature $LiMnO_2$, synthesized by heating in air followed by rapid cooling, has the orthorhombic structure, as the above-mentioned high temperature $LiMnO_2$. However, the high temperature $LiMnO_2$, synthesized by heating followed by slow cooling, has a structure presenting disturbances, as compared to the above-mentioned $LiMnO_2$, because the atomic disturbances induced due to elevated temperatures are frozen as such.

It has been known up to now that, if $LiMnO_2$ is used as a positive electrode active material for a lithium battery or a lithium ion battery, the battery has a higher capacity if the crystalline structure is disturbed than otherwise.

The present inventors have assumed that, by introducing so-called vitreous elements, such as boron B, into $LiMnO_2$ presenting disturbances in its crystal structure, $LiMnO_2$ of the meta-stable phase, in which the disturbances of the crystalline structure are kept in the frozen state, can be stabilized further. This assumption has led to the concept of the present invention.

By substituting B for part of $LiMnO_2$ to give $LiMn_{1-y}B_yO_2$, a lithium manganese oxide can be obtained which is more stable and larger in capacity than conventional $LiMnO_2$. By employing this $LiMn_{1-y}B_yO_2$ as an active material for the positive electrode, it is possible to increase the capacity of the non-aqueous electrolyte battery The proportion y between Mn and B in $LiMn_{1-y}B_yO_2$ is such that $0<y<0.35$. Since B is an electrically inert element not contributing to oxidation or reduction, in distinction from Mn, the capacity of the non-aqueous electrolyte battery 1 is lowered if y is larger than 0.35 because the inert portion of $LiMn_{1-y}B_yO_2$ becomes larger. By setting the proportion y so that $0<y\leq0.35$, the crystalline structure of $LiMn_{1-y}B_yO_2$ can be stabilized in the disturbed state, thus enabling the capacity of the non-aqueous electrolyte battery 1 to be increased.

As the binder contained in the layer of the active material of the positive electrode, well-known resin materials, such as polyvinylidene fluoride, routinely used as a binder of the layer of the positive electrode active material of this sort of the non-aqueous electrolyte battery, may be used.

The positive electrode can 5 accommodates the positive electrode 4 and also serves as an external positive electrode of the non-aqueous electrolyte battery 1.

The separator 6, separating the positive electrode 4 from the negative electrode 2, may be formed of any suitable known materials routinely used as a separator of this sort of the non-aqueous electrolyte battery.

The insulating gasket 7 is built and unified into the negative electrode can 3. The insulating gasket 7 serves to prevent leakage of the non-aqueous electrolyte solution charged into the negative electrode can 3 and the positive electrode can 5.

The non-aqueous electrolyte solution may be any suitable electrolytic solution, routinely used as an electrolytic solution for this sort of the non-aqueous electrolyte battery. The non-aqueous electrolyte solution may be a solution obtained on dissolving lithium salts in a non-protonic non-aqueous solvent, such as propylene carbonate or dimethyl carbonate.

The non-protonic non-aqueous solvent, having a high dielectric constant (dielectric constant $\epsilon>20$), may be enumerated by ethylene carbonate (EC), propylene carbonate (PC), butylene carbonate (BC), γ-butyrolactone (GBL) and vinylene carbonate (VC). On the other hand, the non-protonic non-aqueous solvent, having a low viscosity (viscosity η at ambient temperature <0.8 cP) may be enumerated by diethoxy ethane (DEE), tetrahydrofuran (THF), 2-methyl tetrahydrofuran(2MeTHF), 1, 3-dioxan (DOL), methyl acetate (MA), methyl propionate (MP), dimethyl carbonate (DMC), diethyl carbonate (DEC) and ethylmethyl carbonate (EMC).

One of the non-protonic non-aqueous solvent, having the high dielectric constant and the non-protonic non-aqueous solvent, having the low viscosity, may be selectively used, or both solvents may be used in combination, as necessary. In particular, low temperature cyclic characteristics may be improved by combining these two solvents.

As lithium salts, $LiPF_6$, $LiAsF_6$, $LiBF_4$, $LiClO_4$, $LiCF_3SO_3$, $Li(CF_3SO_2)_2N$ or $LiC_4F_9SO_3$ may be used single or in combination.

There is no particular limitation to the shape of the non-aqueous electrolyte battery 1 according to the present invention, such that the battery may be of the cylindrical, square, coil or button shape. Also, the non-aqueous electrolyte battery 1 may be thin in thickness or large-sized, as desired. In particular, in the cylindrically-shaped, square-shaped or thin type non-aqueous electrolyte batteries, active materials may be provided on both surfaces of the strip-shaped current collectors of the positive electrode and the negative electrode, the current collectors may be coiled with the interposition of a separator and the resulting assembly may then be worked to a shape required of the non-aqueous electrolyte battery to enable the energy per unit volume to be recovered efficiently.

In the above-described embodiment, the non-aqueous electrolyte battery 1, employing the non-aqueous electrolyte solution, is taken as an example of the non-aqueous electrolyte battery. The present invention is, however, not limited to this configuration and may be applied to such a case in which a solid electrolyte or a gel-like solid electrolyte containing a swollen solvent is used as the non-aqueous electrolyte. The present invention also is applicable both to a primary battery and a secondary battery.

EXAMPLES

A non-aqueous electrolyte battery, embodying the present invention, was fabricated, and its characteristics were evaluated.

Example 1

First, a lithium manganese oxide, represented by the general formula $LiMn_{1-y}B_yO_2$, which proves an active material for the positive electrode, was synthesized as follows:

For synthesizing the lithium manganese oxide, $MnCO_3$, $Li_2CO_3$ and $LiBO_2$ were used as manganese, lithium and boron starting materials, respectively. The respective compounds were weighed so that the molar ratio Li:Mn:B is 1.00:0.95:0.05, and sufficiently mixed in an agate mortar to preclude impurities.

The above powder mixture was molded to a cylindrical pellet 15 mm in diameter and 5 mm in thickness. Subsequently, the pellet was heated to 1000° C. at a temperature rising rate of 10° C. per minute, and kept at this temperature for 12 hours in order to cause complete reaction of lithium, manganese and boron to a single phase. The pellet was then quickly cooled in air at ambient temperatures and dried to give a black to brownish powdered lithium manganese oxide.

Then, a positive electrode was fabricated, using the produced lithium manganese oxide as an active material of the positive electrode. For fabricating the positive electrode, 80 wt % of the lithium manganese oxide, obtained as described above, and 15 wt % of graphite, as an electrifying agent, and polyvinylidene fluoride, as a binder, were kneaded together, to give a paste-like positive electrode mixture. As the above-mentioned graphite, KS-15, a product of RONZA Inc., with a mean particle size of 5 to 20 μm, was used. As the above-mentioned polyvinylidene fluoride, #1300, a product of ALDRICH Inc., was used.

The positive electrode mixture, obtained as described above, was coated on an aluminum mesh, operating as a positive electrode current collector. The aluminum mesh, coated with the positive electrode mixture, was dried for one hour at 100° C. in a dry argon stream. After drying, the aluminum mesh was punched to a disc of a pre-set size to prepare a pellet-shaped positive electrode. 60 mg of the active material of the positive electrode were carried per each pellet-shaped positive electrode.

A negative electrode was fabricated by punching a metal lithium sheet to the shape of a disc o substantially the same diameter as the positive electrode.

Then, $LiPF_6$ was dissolved at a concentration of 1 M in an equimolar solvent mixture of propylene carbonate and dimethyl carbonate to prepare a non-aqueous electrolyte solution.

Finally, the positive electrode, fabricated as described above, was accommodated in the positive electrode can, whilst the negative electrode was accommodated in the negative electrode can, and a separator was arranged between the positive and negative electrodes. The non-aqueous electrolyte solution was charged into the positive electrode can and the negative electrode can and sealed by caulking the positive and negative electrode cans to prepare a 2025-type coil-shaped non-aqueous electrolyte battery. The above-mentioned process steps were all carried out in a dry atmosphere.

Example 2

A non-aqueous electrolyte battery was prepared in the same way as in Example 1 except mixing $MnCO_3$, $LiCO_3$ and $LiBO_2$ so that Li:Mn:B=1.00:0.80:0.20.

Example 3

A non-aqueous electrolyte battery was prepared in the same way as in Example 1 except mixing $MnCO_3$, $LiCO_3$ and $LiBO_2$ so that Li:Mn:B=1.00:0.65:0.35.

Comparative Example 1

A non-aqueous electrolyte battery was prepared in the same way as in Example 1 except not using $LiBO_2$ and mixing $MnCO_3$ and $LiCO_3$ so that Li:Mn:B=1.00:1.00:0.00.

Comparative Example 2

A non-aqueous electrolyte battery was prepared in the same way as in Example 1 except mixing $MnCO_3$, $LiCO_3$ and $LiBO_2$ so that Li:Mn:B=1.00:0.60:0.40.

The batteries, fabricated as described above, were put to a charging/discharging test, to evaluate characteristics thereof.

For carrying out the charging/discharging test, initial charging relative to the lithium potential was carried out on each battery with a current density of 0.1 mA/cell until the open circuit voltage reaches 4.5±0.05 V relative to the lithium potential. The charged batteries were then discharged until the closed circuit voltage reached 1.5 V. The discharge current density was fixed during the experiment at 0.1 mA/cell at all times.

Figure 2:
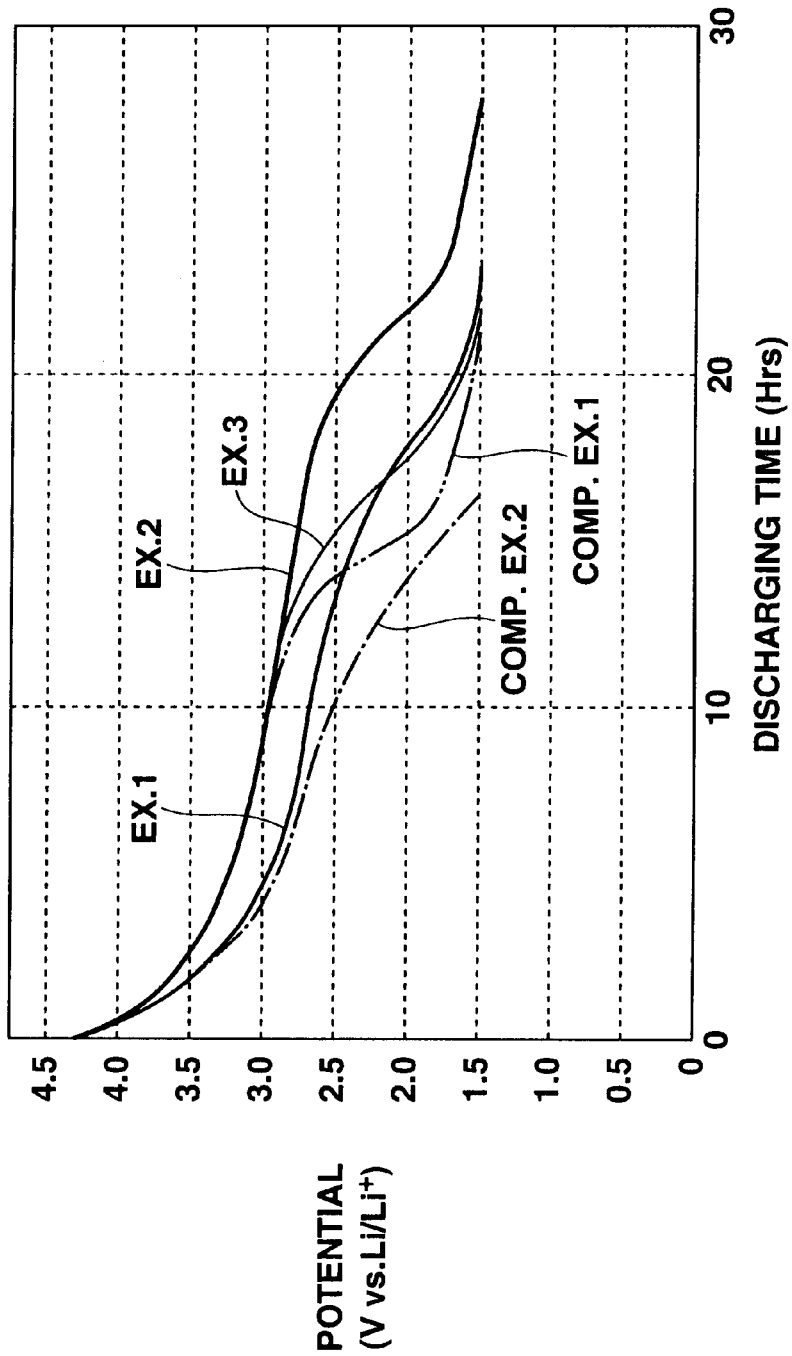
FIG. 2 is a graph showing the relation between the discharging time and the battery voltage of a battery prepared in the Examples.

FIG. 2 shows the relation between the discharging time and the battery voltage (relative to the metal lithium potential), for the non-aqueous electrolyte batteries of the Examples 1 and 3 and the Comparative Examples 1 and 2.

FIG. 2 shows that, with the batteries of the Examples 1 and 3, in which a lithium manganese oxide, with y of $LiMn_{1-y}B_yO_2$ set so that $0<y\leq0.35$, is used as an active material for the positive electrode, the battery voltage falls moderately, while the time until the battery voltage reaches 1.5 V is long, thus indicating the large battery capacity.

It is also seen that, with the batteries of the Comparative Example 1, employing $LiMnO_2$ and not containing boron, the battery voltage falls acutely, while the time until the battery voltage reaches 1.5 V is shorter than in the batteries of the Examples 1 and 3. It is similarly seen that, with the battery of the Comparative Example 2 with y of $LiMn_{1-y}B_yO_2$ set to 0.4, the time until the battery voltage reaches 1.5 V is shorter, thus indicating the lowered capacity.

From the above results, it has been shown that, by employing a lithium manganese oxide, with y of $LiMn_{1-y}B_yO_2$ set so that $0<y<0.35$, a non-aqueous electrolyte battery with a large capacity can be obtained.

What is claimed is:

1. A non-aqueous electrolyte battery comprising:

a positive electrode containing a complex oxide of a transition metal;

a negative electrode arranged facing said positive electrode and containing metal lithium, lithium alloy, or a carbon material capable of doping and undoping lithium; and a non-aqueous electrolyte interposed between said positive electrode and the negative electrode;

said complex oxide of a transition metal is a complex oxide of lithium and manganese represented by the general formula $LiMn_{1-y}B_yO_2$, with $0<y\leq0.35$;

said non-aqueous electrolyte is a solution obtained on dissolving a lithium salt in a non-protonic non-aqueous solvent, said lithium salt is $LiC_4F_9SO_3$.

2. The non-aqueous electrolyte battery according to claim 1 wherein said non-protonic non-aqueous solvent is a solvent having a high dielectric constant and/or a solvent having low viscosity.

3. The non-aqueous electrolyte battery according to claim 2 wherein said solvent having a high dielectric constant is at least one selected from the group consisting of ethylene carbonate (EC), propylene carbonate (PC), butylene carbonate (BC), γ-butyrolactone (GBL) and vinylene carbonate (VC).

4. The non-aqueous electrolyte battery according to claim 2 wherein said solvent having low viscosity is at least one selected from the group consisting of diethoxy ethane (DEE), tetrahydrofuran (THF), 2-methyl tetrahydrofuran (2MeTHF), 1, 3-dioxan (DOL), methyl acetate (MA), methyl propionate (MP), dimethyl carbonate (DMC), diethyl carbonate (DEC) and ethylmethyl carbonate (EMC).

5. A non-aqueous electrolyte battery comprising:

a positive electrode containing a complex oxide of a transition metal;

a negative electrode arranged facing said positive electrode and containing metal lithium, lithium alloy, or a carbon material capable of doping and undoping lithium; and a separator and a non-aqueous electrolyte interposed between said positive electrode and the negative electrode;

said complex oxide of a transition metal is a complex oxide of lithium and manganese represented by the general formula $LiMn_{1-y}B_yO_2$, with $0<y\leq0.35$;

said non-aqueous electrolyte is a solution obtained on dissolving a lithium salt in a non-protonic non-aqueous solvent, said lithium salt is $LiC_4F_9SO_3$.

6. The non-aqueous electrolyte battery according to claim 5 wherein said non-protonic non-aqueous solvent is a solvent having a high dielectric constant and/or a solvent having low viscosity.

7. The non-aqueous electrolyte battery according to claim 6 wherein said solvent having a high dielectric constant is at least one selected from the group consisting of ethylene carbonate (EC), propylene carbonate (PC), butylene carbonate (BC), γ-butyrolactone (GBL) and vinylene carbonate (VC).

8. The non-aqueous electrolyte battery according to claim 6 wherein said solvent having low viscosity is at least one selected from the group consisting of diethoxy ethane (DEE), tetrahydrofuran (THF), 2-methyl tetrahydrofuran (2MeTHF), 1, 3-dioxan (DOL), methyl acetate (MA), methyl propionate (MP), dimethyl carbonate (DMC), diethyl carbonate (DEC) and ethylmethyl carbonate (EMC).

* * * * *